May 24, 1932.    M. SEGAL    1,859,991

HEAT PAD FOR MOLDING COMPOUNDS

Filed Feb. 11, 1929

MEYER SEGAL INVENTOR

BY Victor J. Evans

ATTORNEY

Patented May 24, 1932

1,859,991

UNITED STATES PATENT OFFICE

MEYER SEGAL, OF CHICAGO, ILLINOIS

HEAT PAD FOR MOLDING COMPOUNDS

Application filed February 11, 1929. Serial No. 339,150.

This invention relates to certain novel improvements in heating pads for molding compounds and has for its principal object the provision of an improved construction of this character which will be highly efficient in use and economical in manufacture.

In the dental profession and in analogous arts molding compound is frequently employed for making impressions of objects and the impression made in this compound is then used as a mold in which other things may be cast and formed. This molding compound is a wax-like substance and is rendered plastic by heat. This heating is frequently carried out in a pan of water into which the molding compound is introduced. While this method is satisfactory in that it renders the compound plastic it has been found that where the pan is heated by being held over a suitable source of heat the portion of the pan adjacent the source of heat becomes very hot in comparison to the water and other portions of the pan. Due to this relatively high heat the molding compound has a tendency to and does adhere to these heated portions, which is detrimental since a portion of the compound is lost in this manner and also since the pan soon becomes very unsightly due to the collection of this compound on the heated portions. It is, therefore, the salient object of my invention to provide a device which will greatly facilitate the heating of molding compound in a pan of water which has the temperature thereof raised from an external source.

Another object of my invention is to provide a construction of the foregoing character which will be inexpensive in manufacture and which may be used a repeated number of times.

Other objects will appear hereinafter.

The invention consists in the novel combination and arrangement of parts to be hereinafter described and claimed.

The invention will be best understood by reference to the accompanying drawings showing the preferred form of construction and in which.

My invention is intended to be associated with a pan of any desired configuration which may be heated in the usual well-known manner as for example by holding over a gas flame. The pan is intended to be partially filled with water so as to contain sufficient water to amply cover the compound to be heated.

Figure 2:
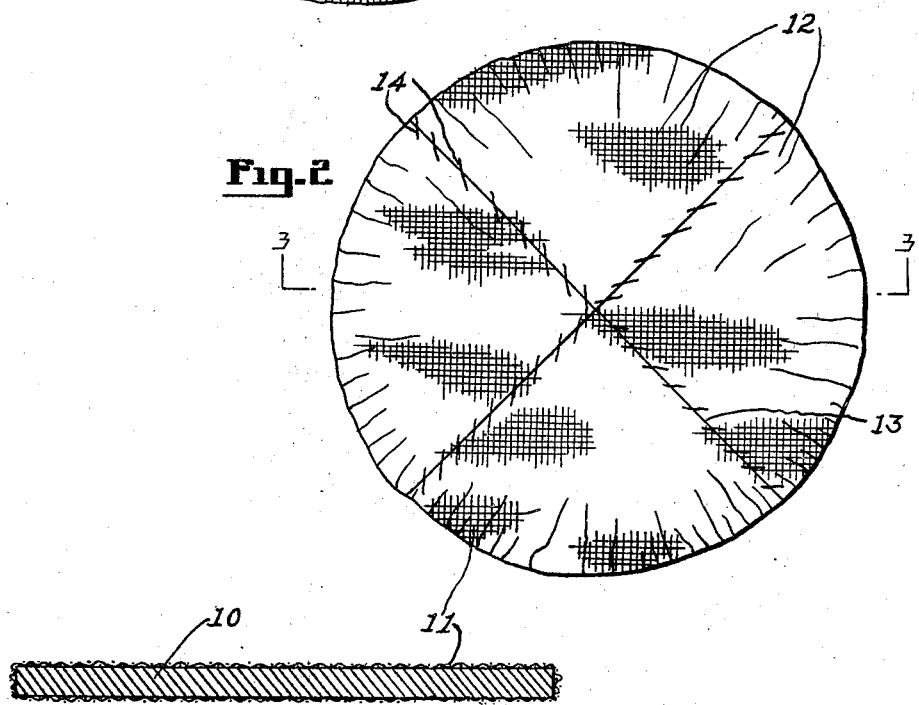
Fig. 2 is a bottom plan view of the device illustrated in Fig. 1.
Figure 3:
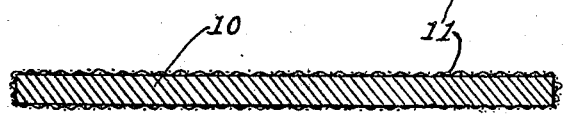
Fig. 3 is a sectional view taken substantially on the line 3—3 on Fig. 1.

Into such a pan I introduce my pad which consists of a circular plate 10 which may be of any suitable thickness and which is made from a material which will not float in water and I have found that the majority of metals is very desirable for such usage. It is apparent, however, that a plate such as 10 if placed upon the bottom of my pan in direct contact therewith will soon reach a temperature substantially similar to the bottom of the pan in the event this bottom is held over a source of heat and, therefore, no advantage would be derived from the usage of my device. In order to insulate against this direct contact between the plate 10 and the bottom of the pan I cover this plate 10 with a suitable section of fabric as for example that known as gauze. I preferably employ a square section of fabric which has sides of a length substantially equal to the diameter of the disc. This section of fabric is indicated by 11 in the drawings and is intended to be disposed over the plate 10. It is obvious that since the section of fabric 11 is of square formation and since the disc 10 is preferably round in contour that the corners of this section of fabric will extend beyond the periphery of the disc 10. These corners are, therefore, folded so as to extend across the opposite side of the disc 10 from that in engagement with the main section of the gauze 11. These corner portions or flaps are indicated by 12 in the drawings and are disposed so that the edges thereof are brought into engagement along diametric lines as is indicated at 13 in Fig. 2. Suitable stitching indicated by 14 is employed for joining these cooperating edges and thus the covering of gauze 11 is securely retained upon the plate 10.

The plate covered by the gauze 11 is placed upon the bottom of the pan and the gauze serves to insulate the plate from the bottom of the pan. The portion of the molding compound to be rendered plastic is then placed on the gauze 11 which covers the plate 10 and due to the inherent quality of the gauze to repel adhesion and the fluid like film created by absorption of water, the molding compound when heated will not stick or adhere to any portions of the plate, nor to the gauze covering, at temperatures up to and including the boiling point of water, when the device is immersed in the manner stated.

In the foregoing I have set forth that my plate is made so as to be substantially circular but it is to be understood that any other desired configuration might be employed without departing from the purview of my invention. It is also to be understood that any desired type of fabric covering might be placed over such a plate and that the overlapping portions or flaps might be joined along co-operating edges thereof in any other analogous manner than the stitching disclosed without departing from the purview of my invention.

Figure 1:
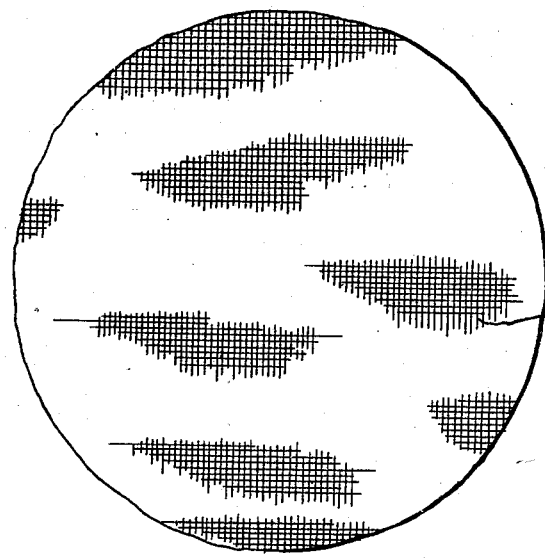
Fig. 1 is a top plan view of a pad constructed in accordance with my invention.

I have found that if desired suitable advertising indicia or the like may be imprinted either upon the plate 10 or upon an additional member inserted over this plate below the section of fabric covering the upper side of the plate, the upper side of said plate being illustrated in Fig. 1. This advertising indicia will, therefore, be conspicuous which is obviously the desire in such matters. It is also to be understood that any desired number of layers of fabric might be employed in my device and remain within the scope of my invention.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claim.

Having thus described my invention what I claim as new and desire to protect by Letters Patent is:

A pad for preventing dental molding wax from adhering to the bottom of a container in which the wax is adapted to be softened by immersion in heated water, comprising a plate member, a covering of fabric material for said plate member having the edges thereof equal in length to the diameter of said plate member, said covering including flap portions extended beyond the periphery of said plate member adapted to be bent across the side thereof opposite that across which the main portion of said fabric is extended, and means for joining the edges of said flap portions on said opposite side to retain said material in covering position relative to said plate member, whereby the wax will be prevented from adhering to the bottom of the container or to the fabric or plate member.

In testimony whereof I affix my signature.

MEYER SEGAL.